United States Patent [19]

Inoue

[11] 3,954,519

[45] May 4, 1976

[54] IRON-CHROMIUM-COBALT SPINODAL DECOMPOSITION-TYPE MAGNETIC ALLOY COMPRISING NIOBIUM AND/OR TANTALUM

[75] Inventor: Kiyoshi Inoue, Tokyo, Japan

[73] Assignee: Inoue-Japax Research Inc., Yokohama, Japan

[22] Filed: Feb. 27, 1975

[21] Appl. No.: 553,651

[30] Foreign Application Priority Data

May 2, 1974 Japan ................................ 49-49950

[52] U.S. Cl. ............................ 148/31.57; 75/126 H; 148/108; 148/120; 148/121

[51] Int. Cl.[2] .................... C04B 35/00; C22C 38/18

[58] Field of Search .................. 75/126 H, 124, 170; 148/31.57, 108, 121, 120, 31.55

[56] References Cited

UNITED STATES PATENTS

| | | | |
|---|---|---|---|
| 3,170,112 | 2/1965 | Bungardt et al. | 75/126 H |
| 3,588,764 | 6/1971 | Olsen et al. | 148/31.55 |
| 3,806,336 | 4/1974 | Kaneko et al. | 75/126 H |

*Primary Examiner*—Walter R. Satterfield
*Attorney, Agent, or Firm*—Karl F. Ross; Herbert Dubno

[57] ABSTRACT

A spinodal decomposition-type hard or semi-hard magnetic alloy consisting by weight essentially of 3 to 20 % cobalt, 10 to 40 % chromium, 0.2 to 5 % one or both of niobium and tantalum, 0 to 5 % aluminum and the balance of iron. When aluminum is to be incorporated, its lower limit should be 0.5 %.

9 Claims, 9 Drawing Figures

20% Co CROSS SECTION

15% Co CROSS SECTION

20%Co+1%Nb CROSS SECTION

15%Co+1%Nb+2%Al CROSS SECTION

Figure 1:
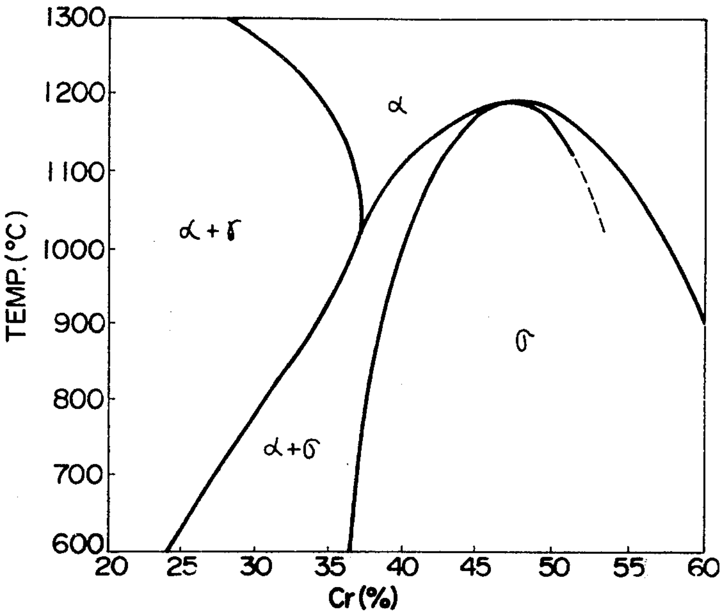

IRON-CHROMIUM-COBALT SPINODAL DECOMPOSITION-TYPE MAGNETIC ALLOY COMPRISING NIOBIUM AND/OR TANTALUM

The present invention relates to a spinodal decomposition-type, iron/chromium/cobalt magnetic alloy and, more particularly, to an improved composition of such an alloy system which makes possible the preparation of the magnetic alloy body in a simplified procedure.

As pointed out in U.S. Pat. No. 3,806,336 issued Apr. 23, 1974, its is known that the iron/chromium alloy stem has, in its composition diagram, a "limit of metastability" or "spinodal" which is thermodynamically defined as the locus of disappearance of the second derivative of the Helmholtz free energy with respect to composition of the system. When a high-temperature composition, which is of homogeneous single phase structure ($\alpha$-phase), of the alloy is brought within the spinodal in a lower temperature range, it is transformed into a separated two-phase structure ($\alpha_1+\alpha_2$), the phase separation being called "spinodal decomposition". The decomposed alloy has a periodic microstructure generally in the order of hundreds of angstroms and which consists of composition modulated two isomorphous phases in which one phase ($\alpha_1$) is in the form of a fine precipitate uniformly distributed in another phase ($\alpha_2$) which forms the matrix. It is observed that if the first phase is such a microstructure is magnetic and the second is nonmagnetic, there results a single-domain structure whereby a highly retentive magnetic body can be obtained.

Said U.S. patent discloses that the iron/chromium alloy of spinodal decomposition type, when it contains cobalt, optionally also with one or both of molybdenum and tungsten in the proportions set forth therein, represents an improved magnetic-material system whose magnetic retentivity and magnetic energy product are comparable with an generally even higher than, those of "Alnico" (iron/aluminum/nickel/cobalt) alloys which have hitherto been the mainstay in the magnetic industry. In addition to their excellent magnetic properties, the improved alloys have, because of their constituent metals, the advantages of lower material cost and better workabilities than the conventional alloys. It has also been taught that addition of silicon up to a certain proportion moderates heat-treatment conditions required to accomplish the spinodal decomposition of the alloys without materially decreasing the desirable magnetic properties attainable therewith. The art has also recognized that addition of one or more of manganese, nickel, copper and aluminum in in a small proportion may be advantageous.

As noted above, the desirable magnetic characteristics of the alloy are imparted when the high-temperature homogeneous single phase i.e. $\alpha$ phase, decomposes into the two isomorphous phases i.e. $\alpha_1$ and $\alpha_2$ phases, past the spinodal. Accordingly, the method of preparing a magnetic body of the improved alloy system essentially comprises the procedures required to effect the spinodal decomposition of the alloy of a preselected composition. The composition may be prepared by melting constituent metals or components together in a suitable furnace or crucible and then casting the melt to form ingots. While such ingots may, after machining to a suitable dimension, be subjected directly to the treatment procedures, it is possible to convert the alloyed ingot into a powder and then to compact and sinter the particles to a coherent body of a desired geometry. In order to effect the spinodal decomposition, while a gradual cooling may be employed to pass the alloy from the high-temperature phase through the miscibility gap area, the following steps have been found more practical and highly suitable. The initial step comprises the solution treatment which includes heating at an elevated temperature for a substantial period of time and subsequent quenching to bring the homogenized high-temperature $\alpha$ phase to room temperature. The quenched body is then tempered or aged whereby the spinodal decomposition to $\alpha_1$ and $\alpha_2$ phases is obtained. The solution treatment may be preceded by hot or cold working. The tempering is preferably done stepwise at different temperatures. The solution-treated body is preferably subjected to an isothermal treatment in a magnetic field prior to the final tempering treatment. Magnetic properties of the body are generally improved when a cold working step is incorporated prior to the final quenching step and subsequent to a preliminary tempering step or the magnetic treatment step.

With the prior compositions, however, to accomplish the solution treatment successfully and thus to form the homogeneous single phase $\alpha$ and bring the same to room temperature or aging temperature requires heating to as high as 1300° C and subsequent quenching at a cooling rate as high as 200° C/sec. Heating to such a high temperature is also required when hot working of the alloy ingot is to be done preparatory to the solution treatment. While, as taught in said U.S. patent, the quenching rate can be lowered substantially by having the alloy contain silicon in the range as specified, the high-temperature heating requirements have imposed great difficulties on the manufacturing process and left much to be desired on the economy of the product magnets.

It is, therefore, the principal object of the present invention to provide an improved composition for a spinodal decomposition-type magnetic alloy whereby the aforementioned problems associated with conventional compositions are overcome. A specific object of the invention is to provide a improved alloy of the type described and containing a further component which is effective to extend the domain of the homogeneous $\alpha$ phase of the alloy system thereby enabling the alloy to be solution-treated and hot-worked at a lower, more practical temperature than the conventional composition while retaining excellent magnetic properties and an improved cold-workability.

I have found that addition of one or both of niobium and tantalum is effective to extend the domain of $\alpha$ phase of the alloy system and also that further addition of aluminum is preferred.

There is thus provided according to the present invention an improved spinodal decomposition type alloy which by weight consists essentially of 3 to 20% cobalt, 10 to 40% chromium, 0.2 to 5% one or both of niobium and tantalum, 0 to 5% aluminum and the balance iron. When aluminum is to be incorporated, its lower limit should be 0.5%.

Figure 5:
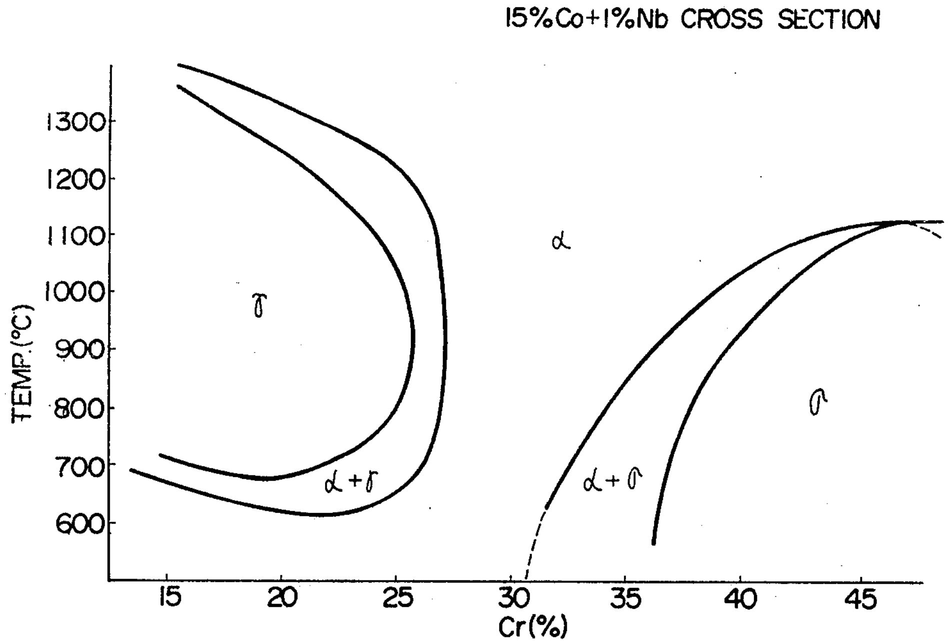
Figure 6:
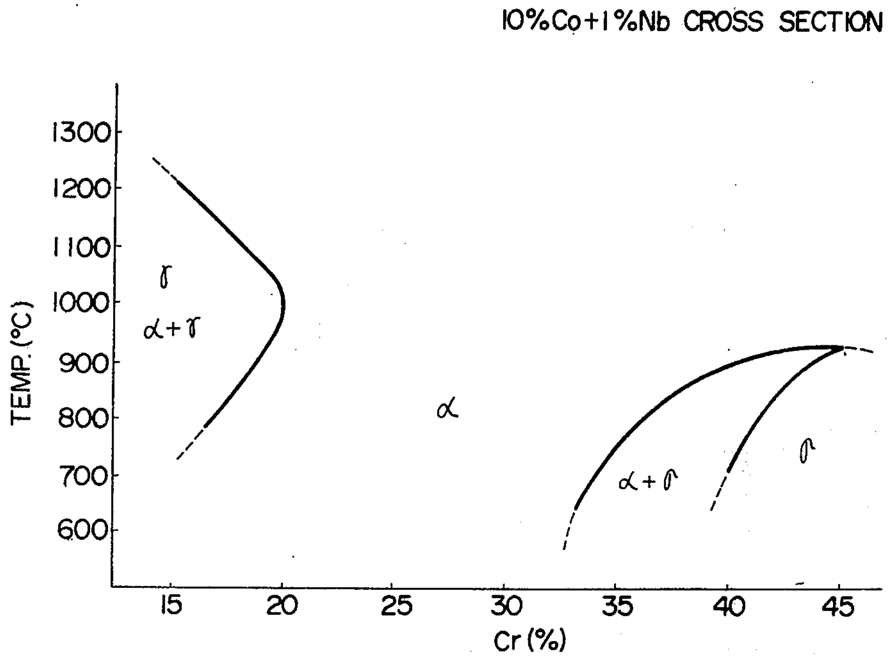
Figure 7:
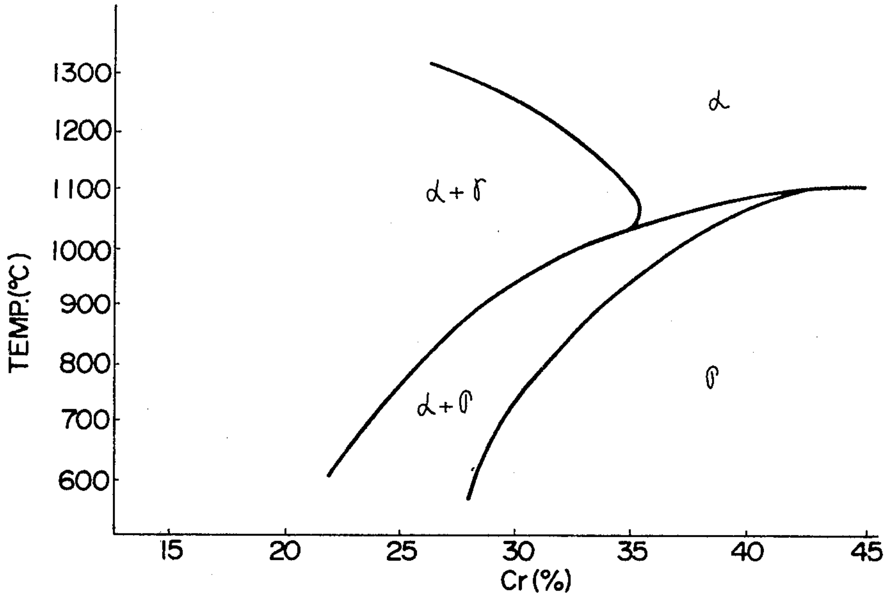
Figure 9:
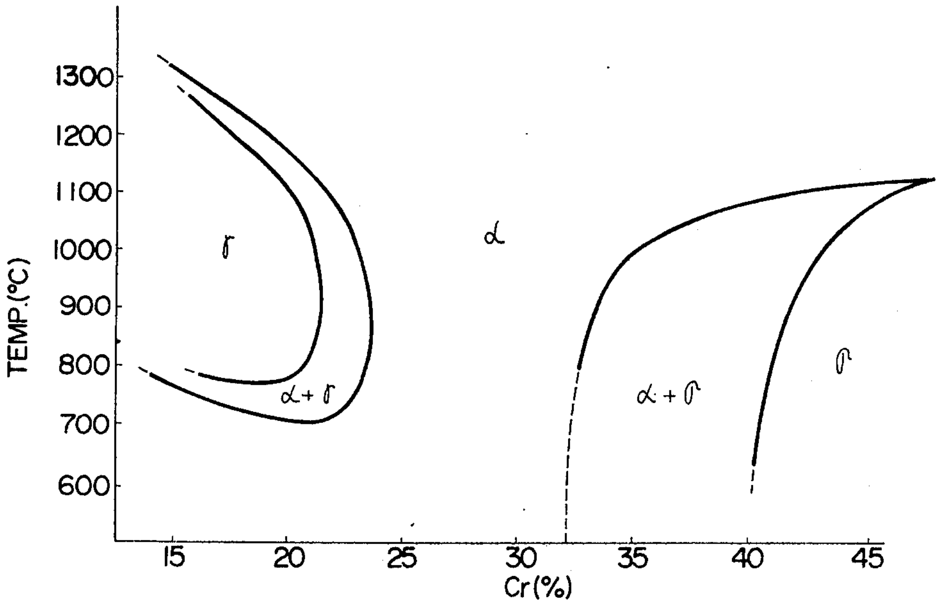
Figure 8:
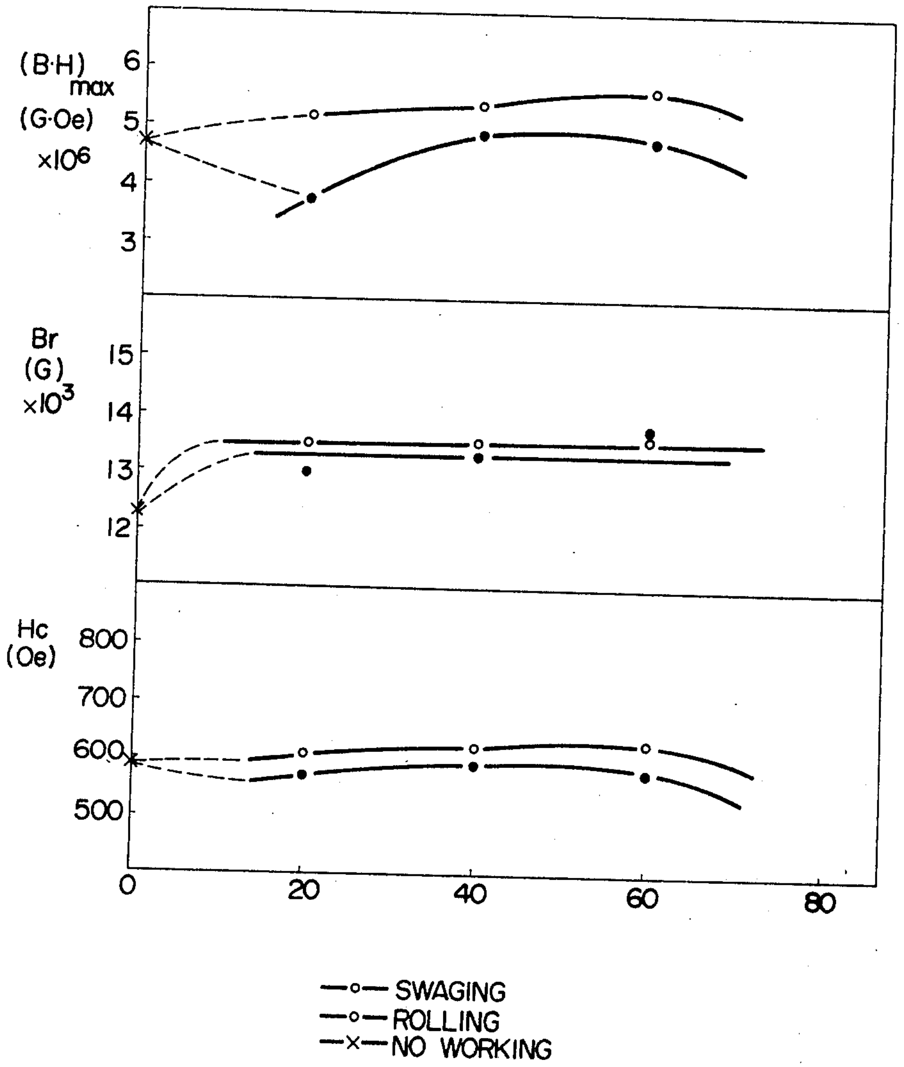

The above and other objects, features and advantages of the present invention will become more readily apparent from the following description, reference being made to the accompanying drawing in which:

FIGS. 1, 2, 3 and 4 are cross-sectional phase diagrams of the ternary iron/chromium/cobalt alloy, with cobalt proportions fixed by weight at 20%, 15%, 10% and 5%, respectively;

FIGS. 5, 6 and 7 are cross-sectional phase diagrams of the quaternary iron/chromium/cobalt/niobium alloy with cobalt-niobium proportions fixed by weight at 15–1%, 10–1% and 20–1%, respectively;

FIG. 8(*a*), (*b*) and (*c*) are graphs showing magnetic properties of an alloy according to the present invention which are plotted against the plastic work rate; and FIG. 9 is a cross-sectional phase diagram of the quinary iron/chromium/cobalt/niobium/aluminum alloy containing by weight 15% cobalt, 1% niobium and 2% aluminum.

Figure 2:
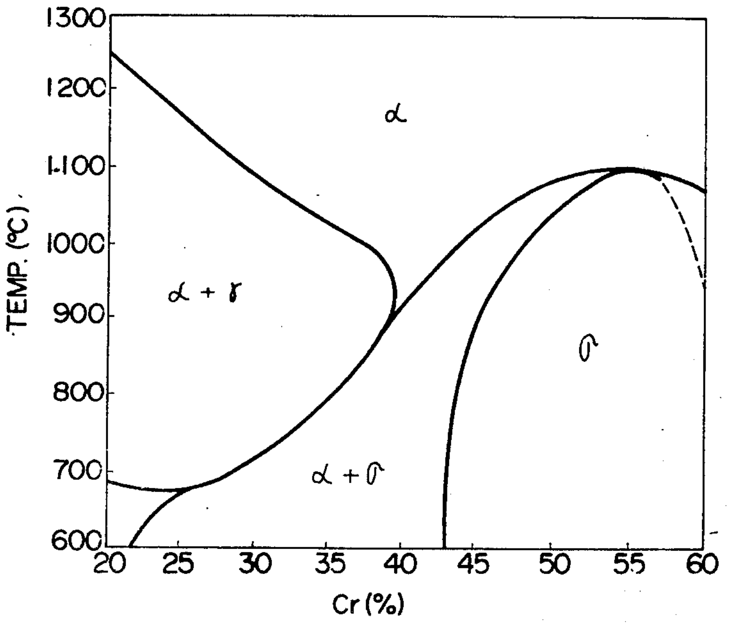
Figure 3:
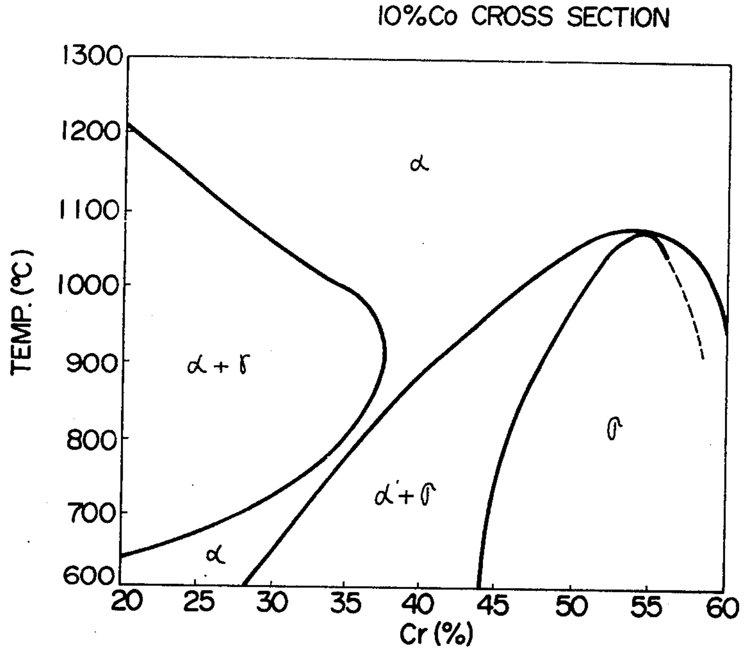
Figure 4:
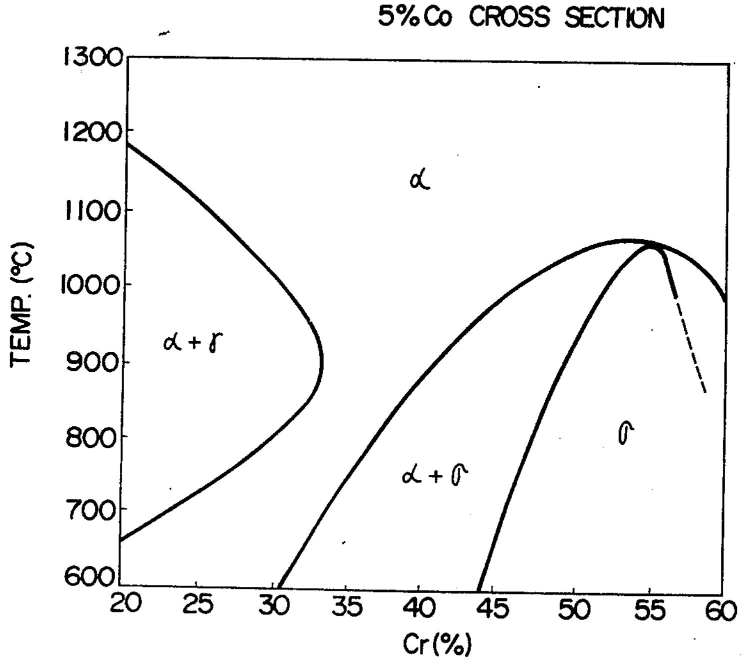

Referring to FIGS. 1 to 4 showing the ternary iron/-chromium/cobalt system having different proportions of cobalt component, it is seen that 20% cobalt alloy has the $\alpha$ phase only in a high-temperature region (FIG. 1) and 15% cobalt alloy has this phase discontinuously both in high-temperature and low-temperature regions (FIG. 2), the separated phase becoming continuous as the proportions of cobalt is decreased (FIGS. 3 and 4). It is seen that with the decrease of cobalt proportion, a corresponding lowering of the transformation point results at a given iron/chromium proportion. In other words, alloys with lower cobalt proportion can be treated at a lower temperature, thus facilitating the solution treatment and hot working. On the other hand, lessening cobalt results in decrease in the coercive force or magnetic retentivity of the alloy desired so that its effective lower limit is set at 3%. A low-cobalt alloy has further advantages in that it reduces the formation temperature of $\delta$ phase which is hard and brittle and thus facilitates both hot and cold working processes. However, merely lowering cobalt proportion as shown in these Figures does not provide a sufficient extension of the domain of $\alpha$ phase, especially toward to low-temperature and high-chromium regions, so as to permit the lowering of the temperature required to effect the solution treatment.

In accordance with the present invention, the domain of $\alpha$ phase is extended significantly by addition of niobium and/or tantalum in an amount of 0.2 to 5% by weight. This is demonstrated from FIGS. 5 and 6 showing the quaternary iron/chromium/cobalt/niobium system containing by weight, respectively, 15% and 10% proportions of cobalt and both incorporating by weight 1% niobium. As a result, it has been found to be possible to accomplish the solution treatment at a temperature as low as 900° C and even still lower, thus greatly facilitating the manufacturing process of magnetic products and rendering it much less costly.

Specimens used to draw the respective phase diagrams of FIGS. 1 to 4 and FIGS. 5 and 6 as well as those of the following Figures which will be described were each prepared by casting a given composition and solution-treating the resulting alloy ingot at 1200° C for 1 hour, this treatment being completed by water quenching. Each so treated specimen was observed to see the microscopic structure and measure the hardness for its phase determination.

Comparison each of the phase diagrams of FIGS. 2 and 5 (15% cobalt cross section) and those of FIGS. 3 and 6 (10% cobalt cross section) will show that niobium when incorporated shifts markedly the $\alpha+\delta$ phase toward the low-chromium region and $\alpha+\delta$ phase toward the high-chromium region while lowering the formation temperature of $\delta$ phase in thee low-chromium region. It is seen that a wide domain of $\alpha$ phase exists which extends over the whole temperature area, viz. the region of 27 to 31% chromium in FIG. 5 and the region of 20 to 33% chromium in FIG. 6. It is to be noted that in each diagram the spinodal (not shown) exists in a temperature region between 600° and 800° C. Accordingly, alloys with the improved composition can be solution-treated at a temperature slightly higher than the spinodal in said temperature range.

I have also found that tantalum is an alternative of niobium effective to extend the domain of $\alpha$ phase in the spinodal decomposition-type magnetic alloy system and may be a part or the whole of the principal additive according to the present invention. More specifically, niobium and tantalum co-exist naturally and they have similar properties to one another. In fact, the niobium component referred to in the foregoing description contained 2 to 3% by weight tantalum. I have confirmed through further experimentation that the combination of tantalum and niobium containing 0 to 100 % tantalum and the remainder niobium is effective significantly to extend the $\alpha$ phase of the base alloy system.

In FIG. 7, there is shown a cross-sectional phase diagram of the quaternary alloy incorporating 1% niobium in the ternary iron/chromium/20% cobalt of FIG. 1. Comparison of the two diagrams shows that there is no substantial difference between them as regards the $\alpha$ phase of the alloys which appears only in the high-temperature region. Further tests were conducted with the proportion of niobium increased up to 5% but no substantial change in this format was observed. It has thus been determined that addition of niobium has little effect in high-cobalt alloys and is only effective in alloys containing cobalt less than 20%. The latter thus represents the upper limit of cobalt component which may be incorporated in the alloy according to the present invention. Its preferred upper limit is 17%.

EXAMPLE

A quaternary alloy containing by weight 15% cobalt, 28% chromium, 1% niobium and the balance iron was prepared by melting an admixture of these components in a high-frequency induction furnace to form an ingot thereof. The ingot was hot and cold worked into a diameter of 10 mm. For the purpose of solution treatment, the ingot was heated at a temperature of 900° C for 1 hour and then water-quenched to room temperature. The ingot was next tempered at 640° C in a magnetic field of 4000 Oersted for 1 hour and then step-tempered, first at a temperature of 610° C for 30 minutes, second at a temperature of 600° C for 1 hour, third at a temperature of 580° C for 1 hour, fourth at a temperature of 560° C for 1 hour and finally at a temperature of 540° C for 5 hours. The resultant body has a residual flux density Br of 12.3 KGauss, a coercive force Hc of 580 Oersted and a maximum energy product (B×H)max of $4.7\times10^6$ Gauss-Oersted.

In the above composition, the $\alpha$ phase as is apparent from FIG. 5 extends continuously over the whole temperature region and consequently the solution treatment can be accomplished at a temperature as low as 900° C, much lower than with conventional compositions. Furthermore, prior to the magnetizing solution treatment, the alloyed ingot in the absence of hard and brittle $\delta$ phase can be plastically worked into a given shape and dimension without particular need for solution treatment which has hitherto been due to this end. The alloy which is entirely of the single $\alpha$ phase need not be heated at a high temperature even where hot working is desired.

Graphs of FIGS. 8(*a*), (*b*), and (*c*) show the effect upon magnetic properties of the use of cold working which step is incorporated between the steps of solution treatment and tempering in the aforementioned example, following the same composition of alloy and the same conditions of solution treatment, magnetic tempering and multiple-step tempering as described. Two different types of cold working, viz. swaging and rolling were employed and compared as shown. In these graphs, the residual flux density, coercive force and maximum energy product of the alloy were respectively plotted along the ordinate with respect to the work rate of the ingot in term of percentage plotted along the abscissa. It is seen that a highest value of maximum energy product $5.7 \times 10^6$ Gauss-oersted is obtained when swaging is employed to work the ingot at a rate of 60 %.

The alloy according to the present invention has usefulness both as hard and semi-hard magnets. The hard magnet may be obtained when the alloy contains by weight 10 to 20 % cobalt while the semi-hard magnet provided when the cobalt proportion ranges between 3 and 10 %. As is apparent from FIG. 6 showing the 10 % cobalt alloy system, in the case of semi-hard magnets, the addition of niobium and/or tantalum is effective over a relatively wide range of chromium, i.e. 20 to 33 % with the 10 % cobalt alloy, from which range the proportion of chromium may be selected as desired. In the case of hard magnets, however, as seen from FIG. 5 showing the 15 % cobalt alloy system, such a range is relatively narrow, i.e. 27 to 31 % with the 15 % cobalt composition.

I have found that further addition of aluminum is effective to increase the extension of desired $\alpha$ phase and thus to permit the proportion of chromium to be selected from an expanded range to provide a hard magnet of desirable magnetic properties.

The cross-sectional phase diagram of FIG. 9 is of the quinary alloy prepared to add 2 % by weight aluminum to the iron/chromium/15%cobalt/1%niobium alloy as shown in FIG. 5. It is seen that this quinary alloy system has a chromium range extended to cover 23 to 33 %.

I have found that addition of aluminum in an amount of up to 5 % has little adverse effect upon the magnetic properties of the alloy and that the lower limit at which its addition becomes effective for the desired phase extension is about 0.5 %.

I claim:

1. A spinodal decomposition-type magnetic alloy consisting by weight essentially of 3 to 20 % cobalt, 10 to 40 % chromium, 0 to 5 % aluminum, 0.2 to 5 % one or both of niobium and tantalum and the balance iron.

2. The alloy defined in claim 1 which contains 0.5 % by weight aluminum.

3. The alloy defined in claim 2 which contains 10 to 20 % by weight cobalt.

4. The alloy defined in claim 1 which contains 3 to 10 % by weight cobalt.

5. A spinodal decomposition-type magnetic alloy consisting by weight essentially of 3 to 17 % cobalt, 10 to 40 % chromium, 0 to 5 % aluminum, 0.2 to 5 % one or both of niobium and tantalum and the balance iron.

6. The alloy defined in claim 5 which contains 0.5 to 5 % by weight aluminum.

7. The alloy defined in claim 6 which contains 10 to 17 % by weight cobalt.

8. A permanent magnet body consisting of a magnetized alloy of the following compositions: at least 3% and less than 20% by weight cobalt, 10 to 40% by weight chromium, 0 to 5% by weight aluminum, 0.2 to 5% by weight of an $\alpha$-domain extending additive selected from the group which consists of niobium, tantalum and mixtures thereof, the balance iron, having been subjected in succession to solution heat treatment, cold working and tampering.

9. A process for making a permanent magnet which comprises the steps of: forming a body of magnetic alloy of the following composition: at least 3% and less than 20% by weight cobalt, 10 to 40% by weight chromium, 0 to 5% by weight aluminum, 0.2 to 5% by weight of an $\alpha$-domain extending additive selected from the group which consists of niobium, tantalum and mixtures thereof, the balance iron, solution heat treating the resulting body; cold working said body by swaging at a work rate of about 60%; and tempering said body.

* * * * *